2,748,123

2-(γ-DIETHYLAMINO-PROPOXY)-4,6-DIMETHYL-PYRIMIDINE, ITS SALTS, AND PROCESSES FOR THE MANUFACTURE THEREOF

Robert R. Burtner, Skokie, Ill., assignor, by mesne assignments, to G. D. Searle & Co., Skokie, Ill., a corporation of Delaware No Drawing. Application May 6, 1954,
Serial No. 428,138

5 Claims. (Cl. 260—256.4)

This invention relates to 2-(dialkylaminoalkoxy)-4,6-dimethylpyrimidines, their acid addition and quaternary ammonium salts, and processes for the preparation of these pyrimidines and their salts. More particularly, this invention relates to compounds of the formula

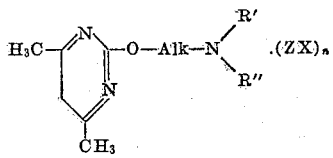

wherein Alk is an alkylene radical containing not more than 4 carbon atoms, R' and R" are lower alkyl radicals containing not more than 5 carbon atoms, Z is hydrogen or a lower alkyl radical containing not more than 5 carbon atoms, X is one equivalent of a non-toxic anion, and $n$ is 0 or an integer not greater than 2.

In the foregoing structural formula, the alkylene radicals comprehended by Alk are bivalent, saturated, acyclic, straight- or branched-chain hydrocarbon radicals of empirical formula $$C_mH_{2m}$$

wherein $m$ is a positive integer less than 5. Among the alkylene radicals represented by Alk as used herein are methylene (—CH₂—), 1,2-ethylene (—CH₂CH₂—),

1,1-dimethyl-1,2-ethylene 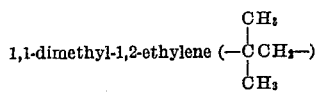

1,2-propylene 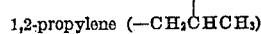

2-methyl-1,3-propylene 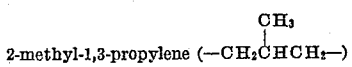

trimethylene (—CH₂CH₂CH₂—), and tetramethylene (—CH₂CH₂CH₂CH₂—) radicals, as well as such other alkylene radicals as fall within the purview of the foregoing definition and terms. The lower alkyl radicals designated by R', R", and Z in the generic formula above include methyl, ethyl, propyl, isopropyl, butyl, isobutyl, secondary butyl, tertiary butyl, amyl, secondary normal amyl, primary isoamyl, secondary isoamyl, tertiary amyl, and like $C_sH_{2s+1}$ radicals wherein $s$ is a positive integer amounting to less than 6. X in the generic formula refers to an anion such as chloride, bromide, iodide, methyl sulfate, ethyl sulfate, benzenesulfonate, toluenesulfonate, tartrate, succinate, malate, acetate, citrate, nitrate, sulfate, phosphate, and sulfamate which, in combination with the cationic portion of a molecule aforesaid, is neither pharmacologically nor otherwise undesirable in pharmaceutical dosage. When $n$ in the generic formula is 0, the term (ZX) drops out and the compounds represented are basic amines. When the compositions referred to are acid addition salts, $n$ is either 1 or 2; when the compositions are quaternary ammonium compounds, $n$ is equal to 1.

The subject compounds are useful in medicine for the treatment of disease and the relief of conditions inimical to the well-being of the animal body. For example, the compounds of this invention show appreciable chemotherapeutic promise in the field of cardiac pathology. In particular, they are valuable because of their digitalis-like activity, manifesting marked capacity for myocardial stimulation in instances of insufficiency associated with the failing heart. Moreover, the claimed compounds are of importance as antihypertensive agents, being useful for reduction of the elevated blood pressures characteristic of multiple disease states.

The amine bases which comprise this invention are relatively insoluble in water but may be dissolved in dilute acids and in most of the common organic solvents. The acid addition and quaternary ammonium salts of this invention are, on the other hand, readily soluble in water and in aqueous solutions of alcohols or other water-miscible organic solvents. The subject compounds may be administered in solid form as tablets or capsules; dissolved in aqueous media, they may be given parenterally.

The compounds to which this invention relates are derived from 4,6-dimethyl-2-halopyrimidine (desirably 4,6-dimethyl-2-chloropyrimidine) by interaction with a dialkylaminoalkanol in the presence of a condensing agent such as sodium using a relatively non-polar, inert, organic solvent (for example, toluene) as the reaction medium. The reaction, which is somewhat exothermic, is initiated at room temperatures and completed at between 65° and 130° centigrade over periods of time ranging upward from 1 hour. Conversion of the amine bases thus obtained to the corresponding acid addition salts is accomplished by simple admixture of these compounds with one or two equivalents of any of various inorganic and strong organic acids, the anionic portion of which conforms to X as hereinabove defined. Alternatively, the bases in question may be quaternized by addition of an alkyl ester of the formula

Z and X having the meanings hereinbefore assigned. Quaternization takes place in the temperature range between 25° and 100° centigrade, using inert solvents such as chloroform, acetone, methyl ethyl ketone, methanol, butanol, and the like as reaction media. Quaternization is ordinarily completed in from 12 to 48 hours and is generally carried out in a closed system if a lower alkyl halide—such as methyl chloride—is one of the reagents. Using methyl chloride, the reaction may be smoothly effected in chloroform solutions at 80° centigrade, the reaction time being 24 hours.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

Example 1

2 - (γ-diethylaminopropoxy)-4,6-dimethylpyrimidine.—
A solution of 142 parts of 4,6-dimethyl-2-chloropyrimidine in 130 parts of toluene is added at room temperature with agitation to a solution of 46 parts of sodium in 786 parts of γ-diethylaminopropanol. Heat is evolved. The reaction mixture is maintained at 85–100° C. with continued agitation for 3 hours. Approximately 5000 parts of saturated aqueous sodium chloride is introduced, following which the materials are extracted with ether. From the ether extract is obtained, on distillation, a yellow oil B. P. about 125° C. at 0.5 mm. pressure. Redistillation of this material—2-(γ-diethylaminopropoxy)-4,6-dimethylpyrimidine — affords a nearly colorless product, B. P. 110° C. at 0.25 mm. pressure, $n_D^{25}$ 1.4862. The product has the formula

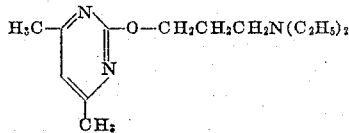

*Example 2*

2 - (γ-*diethylaminopropoxy*)-4,6 - *dimethylpyrimidine dihydrochloride*.—A solution of 8 parts of the base of the foregoing Example 1 in approximately 20 parts of propanol-2 is treated with two equivalents of an absolute propanol-2 solution of hydrogen chloride and then diluted with 175 parts of anhydrous ether. The crystalline salt which precipitates in process is collected, rinsed with ether, and finally recrystallized from a mixture of propanol-2 and ethyl acetate. The pure white 2-(γ-diethylaminopropoxy)-4,6 - dimethylpyrimidine dihydrochloride thus obtained is too hygroscopic to manifest a definitive melting point.

*Example 3*

2 - (γ-*diethylaminopropoxy*)-4, 6- *dimethylpyrimidine methiodide*.—Interaction of 67 parts of the base of Example 1 and 43 parts of methyl iodide in 750 parts of chloroform at room temperatures over a 24 hour period, followed by removal of solvent, affords the desired quarternary salt as a residue. Preliminary purification of the residue is achieved by suspension in approximately 1400 parts of anhydrous ether, after which the salt is crystallized from a mixture consisting of 3 volumes of propanol-2 and 9 volumes of ethyl acetate. The lustrous, buff-colored leaflets of 2-(γ-diethylaminopropoxy)-4,6-dimethylpyrimidine methiodide thus obtained show M. P. 181–182° C. The product is soluble in water.

I claim:

1. A compound selected from the group consisting of 2-(γ-diethylaminopropoxy)-4,6-dimethylpyrimidine, and non-toxic acid addition and quaternary ammonium salts thereof.

2. In a process for the preparation of a compound selected from the group consisting of 2-(γ-diethylaminopropoxy)-4,6-dimethylpyrimidine and non-toxic acid addition and quaternary ammonium salts thereof, the step which comprises reacting a 4,6-dimethyl-2-halopyrimidine with γ-diethylaminopropanol in the presence of sodium as a condensing agent, using a non-polar inert organic solvent as the reaction medium, and temperatures in the range of 65°–130° centigrade.

3. In a process for the preparation of a compound selected from the group consisting of 2-(γ-diethylaminopropoxy)-4,6-dimethylpyrimidine and non-toxic acid addition and quaternary ammonium salts thereof, the step which comprises reacting at 85–100° centigrade 2-chloro-4,6-dimethylpyrimidine with γ-diethylaminopropanol in the presence of sodium as a condensing agent, using toluene as the reaction medium.

4. 2 - (γ-diethylaminopropoxy) - 4,6 - dimethylpyrimidine dihydrochloride.

5. 2 - (γ-diethylaminopropoxy) - 4,6 - dimethylpyrimidine methiodide.

References Cited in the file of this patent

Donleavy et al.: J. Am. Chem. Soc. 57, 753–54 (1935).